United States Patent

[11] 3,634,066

| [72] | Inventors | Russell E. Matthews<br>Midland;<br>Jack J. Ott, Hemlock, both of Mich. |
|---|---|---|
| [21] | Appl. No. | 836,779 |
| [22] | Filed | June 26, 1969 |
| [45] | Patented | Jan. 11, 1972 |
| [73] | Assignee | The Dow Chemical Company<br>Midland, Mich. |

[54] METHOD FOR RECLAIMING SCRAP METAL PARTICLES
5 Claims, 3 Drawing Figs.

[52] U.S. Cl. ............................................... 75/65, 75/67, 75/134
[51] Int. Cl. .............................................. C22b 7/00, C22b 45/00, C22c 23/00
[50] Field of Search .................................... 75/65, 44, 43, 67, 53

[56] References Cited
UNITED STATES PATENTS

| 1,629,563 | 5/1927 | Westberg | 75/44 |
| 3,396,777 | 8/1968 | Reding | 75/67 |

*Primary Examiner*—Winston A. Douglas
*Assistant Examiner*—Peter D. Rosenberg
*Attorneys*—Griswold and Burdick, V. Dean Clausen and William R. Norris ABSTRACT: An aggregate of scrap metal particles is charged to an enclosed receptacle mounted above a molten-metal bath, the bath metal being oxidatively reactive with the atmosphere trapped in the receptacle. The receptacle is immersed in the molten bath metal such that either the base wall or a moveable cover of the receptacle is submerged below the surface of the bath, while maintaining the bath temperature preferably above the melting point of the scrap metal. Openings in the receptacle cover or base wall permit the bath metal to react with the receptacle atmosphere and thereby create a "self-generated" vacuum within the receptacle. Flow of molten metal into the receptacle, as induced by the vacuum environment, melts the scrap particles contained therein. The receptacle is then raised above the level of the metal bath to a point where the aggregate melt can drain through the openings in the receptacle base or cover and back into the molten metal bath.

PATENTED JAN 11 1972

3,634,066

INVENTORS.
Russell E. Matthews
Jack J. Ott
BY
V. Dean Clausen
AGENT

METHOD FOR RECLAIMING SCRAP METAL PARTICLES

BACKGROUND OF THE INVENTION

The invention relates broadly to a method for reclaiming or recovering scrap particles. More specifically, the invention concerns a method for remelting finely divided scrap metal in a substantially oxygen-free atmosphere.

Certain metals in particulate form, such as scrap metal chips or powder obtained from machining of solid metal such as castings, extrusions, plate metal, and the like, are extremely difficult to recover in useable form because of their high affinity for atmospheric oxygen. A prime example of such a metal is magnesium. One method for remelting magnesium chips involves dumping the particles into an open pot containing molten magnesium. The procedure is inefficient and hazardous in that the magnesium particle mass, particularly in the form of powder or finely divided chips, will frequently ignite upon contact with the surface of the molten metal. Such combustion causes loss of metal by oxidation and may be vigorous enough to be hazardous to personnel and equipment.

Another method which has been employed in remelting magnesium scrap involves feeding the scrap particles to a catch basin located above a melting pot. While in the catch basin the particles are wetted and covered by a molten flux recirculated from the melting pot. The metal-flux mass is then discharged into the pot to melt the scrap. Once the melting pot is full the remelted metal is pumped into ingot molds or pans to solidify. The procedure has not been entirely satisfactory, however, because of certain disadvantages. One drawback is that the flux ingredients, which include such compounds as NaCl, CaCl$_2$, and KCl, readily react with the atmosphere above the melting pot to produce corrosive vapors which are hazardous to personnel and detrimental to equipment. The flux compositions also absorb water which is detrimental when added to a melt of metal and flux. Another disadvantage is that the procedure requires the constant attention of an operator to closely control and coordinate the feed rate of scrap metal and flux to the melting pot in order to prevent waste and inefficiency. Still another disadvantage is that the procedure requires a substantial amount of complex equipment.

SUMMARY OF THE INVENTION

A broad object of the present invention is to provide a method for reclaiming oxidatively reactive metal particles which is more efficient, less complex, and which does not involve the hazardous aspects of the prior methods.

A more specific object is to provide a method for remelting metal particles in which the particles to be remelted are contained in an enclosed receptacle immersed in a molten-metal bath, the bath metal being oxidatively reactive with the atmosphere entrapped in the enclosed receptacle.

Broadly stated, the method of this invention contemplates providing an enclosed receptacle having at least one opening therein permitting access to the interior of the container. The interior of the receptacle is substantially filled with an aggregate of scrap metal particles and the receptacle is immersed in a molten-metal bath to a point at which the receptacle opening is submerged in the bath metal. While maintaining the bath metal temperature at least equal to the melting point of the scrap metal, the receptacle opening is held beneath the surface of the bath long enough for the molten bath metal to react with the atmosphere of the receptacle interior and thereby vacuum-induce a flow of molten metal into the receptacle interior. Molten-metal flow into the receptacle is maintained long enough to melt the scrap metal particle aggregate and the receptacle is then raised out of the metal bath far enough to discharge the metal melt into the bath.

In a preferred method, the invention comprises providing a receptacle with an enclosed base and an open top, the top including a perforated moveable cover. The receptacle is mounted on a rotatable support positioned above the surface of a molten-metal bath, such that the enclosed receptacle base is submerged in the metal bath. The receptacle is filled with an aggregate of scrap metal particles to be remelted and the top of the receptacle is closed off with the moveable cover. In closing the receptacle a certain amount of the surrounding atmosphere, where is oxidatively reactive with the metal comprising the molten bath, is entrapped within the receptacle. The receptacle is rotatably inverted to submerge the cover in the metal bath, the bath metal being maintained at a temperature at least equal to, and preferably slightly above, the melting point of the scrap metal. The receptacle cover is held submerged in the metal bath for a time sufficient for the molten bath metal to oxidatively react with the receptacle atmosphere, the reaction thereby creating a so-called "self-generated" vacuum within the receptacle. The vacuum condition induces the molten metal to flow into the receptacle through the perforated cover so that the molten metal will contact the scrap metal aggregate. Flow of the molten metal into the receptacle is maintained for a period of time sufficient to completely fill the voids in the receptacle and melt the particle aggregate. Once the aggregate is melted, the receptacle is rotatably reversed (i.e., in the opposite direction) to a point whereby the aggregate melt can flow out of the receptacle through the perforated cover and back into the molten-metal bath.

Another embodiment of the invention contemplates utilizing the apparatus as described in the preferred embodiment, but employs a different method of remelting the scrap particle aggregate. In this embodiment the entire receptacle is lowered into the metal bath to a point at which the receptacle cover is submerged beneath the surface of the bath. In the same manner of the preferred method, the receptacle is held submerged in the metal bath for a time sufficient to generate the desired vacuum condition in the receptacle and induce metal flow into the receptacle through the perforated cover, the flow being maintained long enough to melt the scrap particles in the receptacle. Once the scrap metal aggregate is completely melted, the receptacle is raised above the surface of the bath and turned over or tilted to a position which will allow the aggregate melt to flow out of the receptacle through the perforated cover and into the metal bath.

Still another method of the invention utilizes a slightly different apparatus (not illustrated) than that employed in the preferred embodiment described above. This method contemplates providing a receptacle having an enclosed base (base wall) with one or more openings therein and a solid cover which is moveable between open and closed positions. The receptacle is filled with scrap metal aggregate and mounted above the surface of the molten-metal bath such that the receptacle base wall lies adjacent the surface of the metal bath, on a mounting means adapted to raise and lower the receptacle. The receptacle is lowered into the metal bath to a point where the openings in the base wall are submerged beneath the surface of the bath, while maintaining the bath temperature at least equal to the melting point of the scrap metal. The receptacle base wall is held submerged in the metal bath a sufficient time for the molten metal to react with the receptacle atmosphere and create a self-generated vacuum which induces flow of molten metal into the receptacle through the base wall opening. In the same manner as described in the preferred embodiment, molten metal flow into the receptacle is maintained for a time sufficient to completely melt the particle aggregate. Once the aggregate is completely melted the receptacle is raised to a point whereby the opening in the base wall is above the surface of the metal bath and the receptacle cover is opened to vent the receptacle and thereby induce the aggregate melt to flow through the base wall openings and back into the molten bath.

BRIEF DESCRIPTION OF THE DRAWING

The drawing, as represented by FIGS. 1–3, illustrates an apparatus which may be used to practice the preferred method of this invention.

More specifically.

Figure 1:
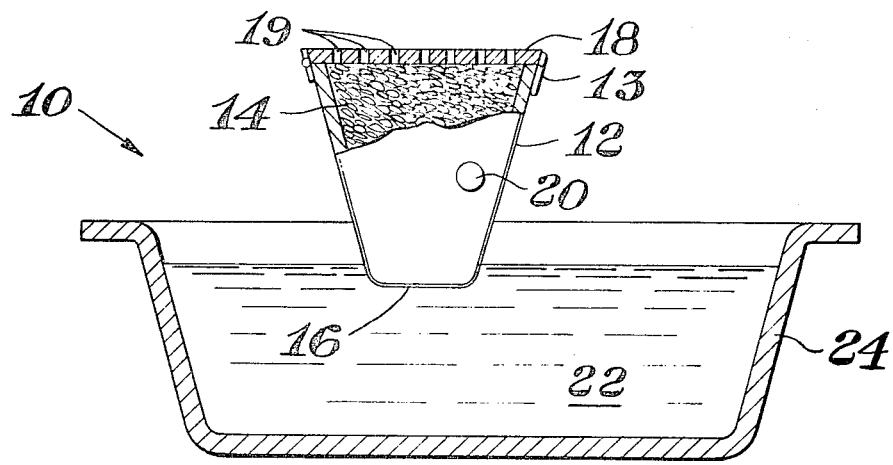
FIG. 1 is a front elevation view, partly in section, of a receptacle suitable for containing scrap metal particles, the receptacle being mounted on a rotatable support above the surface of a molten-metal bath.

The apparatus illustrated herein represents only one embodiment of an apparatus which may be employed in the practice of the invention, the form shown being selected for convenient illustration and clear demonstration of the principles involved.

DESCRIPTION OF A PREFERRED EMBODIMENT

Referring to the drawing, the numeral 10 designates generally an apparatus suitable for carrying out the method of the invention. The apparatus 10 includes a pot or receptacle 12 suitable for containing an aggregate of scrap metal particles 14 which are to be remelted. As indicated in the drawing, the receptacle 12 has an enclosed base wall 16 and a normally open top, the top being fitted with a hinged cover 18 to provide for opening or closing of the receptacle top as desired. In the illustrated embodiment the receptacle 12 is mounted on a suitable rotatable support, such as a pivot bar 20, the pivot bar being positioned above the surface of a molten-metal bath 22, as contained in a crucible 24. The receptacle 12 is preferably mounted on the pivot bar 20 such that the receptacle base wall 16 is submerged in the molten-metal bath 22.

By holding the base of receptacle 12 submerged in the bath 22 prior to filling the receptacle with scrap metal particles 14, the heat from the metal bath keeps the atmosphere inside the receptacle substantially dry, i.e., free of atmospheric moisture. This prevents generation of hydrogen in the receptacle atmosphere, a condition which may create an explosion if the gas accumulation is high enough. Where it may be desired to mount the receptacle 12 above the surface of bath 22, such that the base wall 16 does not contact the molten metal, the receptacle may be heated by other suitable means (not shown) to dry the receptacle atmosphere. For example, the receptacle may be heated by directing a gas flame into it, by electrical heating wires encased in an insulated jacket fitted around the receptacle, or by heating the receptacle in an oven before mounting it on the pivot support 20.

Figure 2:
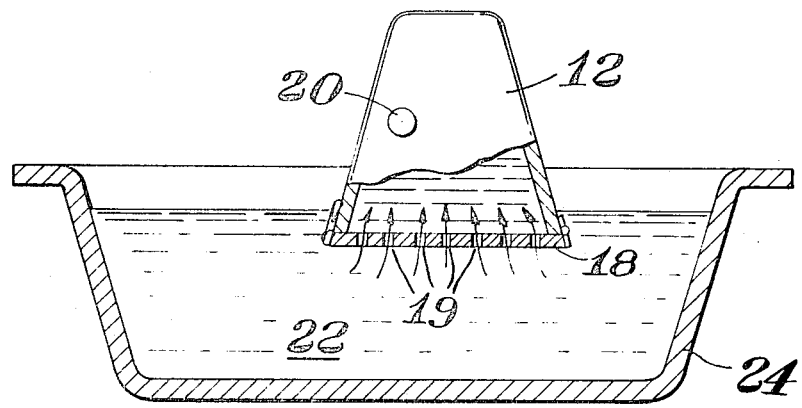
FIG. 2 is a view similar to FIG. 1, but showing the receptacle in inverted position with the receptacle cover submerged in the metal bath.
Figure 3:
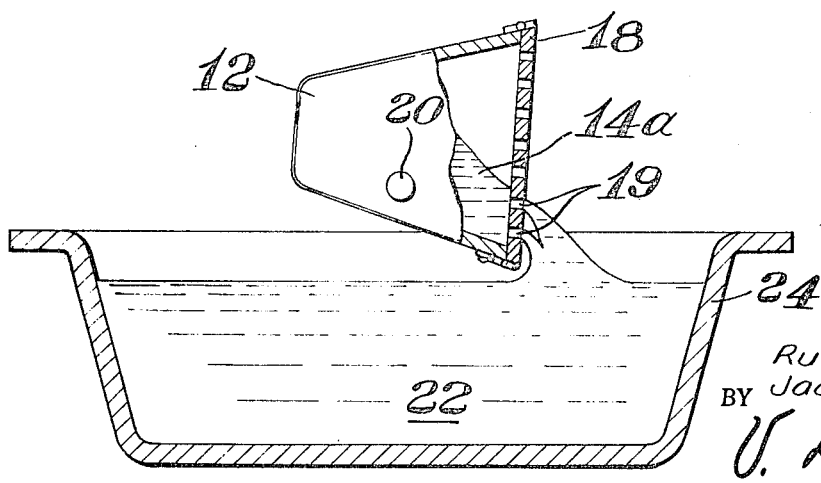
FIG. 3 is a view similar to FIG. 1, but showing the receptacle in an intermediate position which permits the scrap metal melt to drain from the receptacle into the metal bath.

Once the atmosphere in receptacle 12 is relatively dry the receptacle is substantially filled with scrap metal particles 14 and cover 18 is closed and latched shut with a hook 13, or other suitable fastener. As shown in FIG. 2, the receptacle 12 is then inverted by rotating it on the pivot support bar 20 to thereby submerge the cover 18 beneath the surface of metal bath 22. When receptacle 12 is in inverted position a small amount of the molten metal at the surface of the bath 22 will leak into the receptacle through openings 19 in cover 18 and react oxidatively with the atmosphere trapped in the receptacle. The reaction removes most of the oxygen from the receptacle atmosphere and thereby creates a virtually "self-generated" vacuum within the receptacle. The vacuum environment of the receptacle thus induces a flow of molten metal 22 into the receptacle, the flow continuing until the reaction of the molten metal with the receptacle atmosphere is complete. Receptacle 12 can then be reversibly rotated on the support bar 20, as shown in FIG. 3, to a point at which the aggregate melt 14a will flow back into the metal bath 22 through the openings 19 in cover 18. Once the melt 14a is drained from the receptacle 12, the receptacle can be rotated back to its original upright position, as illustrated in FIG. 1, and again refilled with scrap metal aggregate in preparation for repeating the remelting procedure.

The method of this invention has been found to be particularly useful in the reclaiming of magnesium scrap particles. In remelting magnesium according to the present procedure the only loss of metal which occurs is that amount of metal at the surface of the molten bath which is oxidized by the atmosphere within the receptacle in generating the desired vacuum environment. As would be apparent, the amount of metal lost in the reaction (as a metal oxide) depends on the size of the receptacle, since the receptacle size determines the volume of the reactive atmosphere. In the case of magnesium the loss is so small as to be almost negligible, in that the reaction of magnesium with oxygen, to give magnesium oxide, is on an equimolar basis.

In the practice of the present method, it is considered desirable to employ the same kind of metal in the molten bath as the metal which comprises the scrap metal particle aggregate. It is not intended, however, that the invention be limited to this particular concept. It is contemplated, for example, that any metal with a melting point at least equal to, or above, the melting point of the scrap metal to be remelted may be used as the molten metal bath in the practice of the invention. In the case where the scrap metal and the molten bath metal are not the same type of metal, it would be understood that the dissimilar metals will form a common melt in the crucible. In this embodiment the two metals may be separated by procedures known to the art. Alternatively, the combined metals may be allowed to solidify if an alloy product is desired.

To successfully remelt magnesium according to the method of this invention the temperature of the molten metal bath should be maintained at between about 650° and 700° C. Desirably, the scrap magnesium particles to be remelted should be at least 100 mesh size or larger, because of the extreme reactivity of finely divided magnesium with oxygen at the elevated temperatures required to melt the metal. Further, it is preferred that the openings in the receptacle cover or base wall (depending on the apparatus used) be only large enough to permit a steady flow of the molten metal into the receptacle. Small openings in the receptacle create a turbulence in the flow of metal into the receptacle, which improves surface contact between the molten metal and scrap particles and thereby enhances melting of the scrap metal.

What is claimed is:

1. A method of reclaiming scrap metal particles which comprises the steps of:
    providing a receptacle having an enclosed base and an open top, the top including a perforated cover moveable between open and closed positions;
    substantially filling the receptacle with an aggregate of scrap metal particles and thereafter closing the receptacle cover;
    mounting the receptacle on a rotatable support positioned above the surface of a molten-metal bath such that the enclosed base of the receptacle is submerged in the metal bath;
    rotatably inverting the receptacle to thereby submerge the cover in the metal bath, while maintaining the metal bath at a temperature at least equal to the melting point of the scrap metal;
    holding the receptacle cover submerged in the metal bath for a period of time sufficient for the molten metal to react with the atmosphere entrapped in the receptacle and thereby create a substantial vacuum condition in the receptacle to induce a flow of molten metal into the receptacle through the perforated cover;
    maintaining the flow of molten metal into the receptacle for a period of time sufficient for the molten metal to completely melt the scrap metal particle aggregate;
    rotatably reversing the receptacle to a point whereby the metal aggregate melt will flow out of the receptacle through the perforated cover and into the molten-metal bath.

2. The method of claim 1 wherein the metal comprising the molten metal bath is the same metal which comprises the scrap metal particle aggregate.

3. The method of claim 1 in which the metal is magnesium.

4. A method of reclaiming scrap metal particles which comprises the steps of:

providing a receptacle having a base wall with at least one opening therein and a solid cover, the cover being moveable between open and closed positions;

substantially filling the receptacle with an aggregate of scrap metal particles and thereafter closing the receptacle cover;

mounting the receptacle above the surface of a molten-metal bath such that the receptacle base wall lies adjacent the surface of the metal bath, the mounting means being adapted to raise and lower the receptacle;

lowering the receptacle into the metal bath to a point where the opening in the receptacle base wall is submerged in the metal bath, while maintaining the temperature of the bath at least equal to the melting point of the scrap metal;

holding the receptacle base wall submerged in the metal bath for a period of time sufficient for the molten metal to react with the atmosphere entrapped in the receptacle and thereby create a substantial vacuum condition in the receptacle to induce a flow of the molten metal into the receptacle through the base wall opening;

maintaining the flow of molten metal into the receptacle for a period of time sufficient for the molten metal to completely melt the scrap metal particle aggregate;

raising the receptacle to a point whereby the opening in the base wall is above the surface of the metal bath;

opening the receptacle cover to thereby induce the metal aggregate melt to flow out of the receptacle through the base wall openings and into the molten-metal bath.

5. A method of reclaiming scrap metal particles which comprises the steps of:

providing a receptacle having an enclosed base and an open top, the top including a perforated cover moveable between open and closed positions;

substantially filling the receptacle with an aggregate of scrap metal particles and thereafter closing the receptacle cover;

lowering the entire receptacle into a molten-metal bath to a point whereby the receptacle cover is submerged beneath the surface of the metal bath, while maintaining the temperature of the bath at least equal to the melting point of the scrap metal;

holding the receptacle submerged in the metal bath for a period of time sufficient for the molten metal to react with the atmosphere entrapped in the receptacle and thereby create a substantial vacuum condition in the receptacle to induce a flow of the molten metal into the receptacle through the perforated cover;

maintaining the flow of molten metal into the receptacle for a period of time sufficient for the molten metal to completely melt the scrap metal particle aggregate;

raising the receptacle above the surface of the metal bath and tipping the receptacle to a position thereby the aggregate melt will flow out of the receptacle through the perforated cover and into the molten-metal bath.

* * * * *